United States Patent [19]

Fabiano

[11] Patent Number: 5,146,669
[45] Date of Patent: Sep. 15, 1992

[54] METHOD OF MANUFACTURING AN INSERT DRILL

[76] Inventor: Joseph F. Fabiano, 4776 Huxley Dr., Rockford, Ill. 61101

[21] Appl. No.: 738,671

[22] Filed: Jul. 31, 1991

[51] Int. Cl.⁵ .............................................. B21K 5/02
[52] U.S. Cl. ..................................... 29/557; 76/108.6; 409/131
[58] Field of Search ................. 51/288; 409/131, 132; 29/557, 558; 76/108.6

[56] References Cited

U.S. PATENT DOCUMENTS

| | | | |
|---|---|---|---|
| 2,675,742 | 4/1954 | Petre | 409/132 |
| 3,621,613 | 11/1971 | Grob et al. | 51/288 |
| 3,626,645 | 12/1971 | Rochet | 51/288 |
| 4,230,429 | 10/1980 | Eckle | 408/223 |
| 4,558,975 | 12/1985 | Hale | 408/223 |

FOREIGN PATENT DOCUMENTS

| | | | |
|---|---|---|---|
| 374152 | 6/1973 | U.S.S.R. | 51/288 |
| 476137 | 11/1975 | U.S.S.R. | 51/288 |
| 1465268 | 3/1989 | U.S.S.R. | 51/288 |

OTHER PUBLICATIONS

Metcut Indexable Drill, by Metal Cutting Tools, Inc.
Drill-Max Indexable Drills, by Ingersoll Cutting Tools.
Kub-It-Heavy Duty Spiral-Fluted Indexable Drills, by Komet.

*Primary Examiner*—Daniel W. Howell
*Attorney, Agent, or Firm*—McAndrews, Held & Malloy, Ltd.

[57] ABSTRACT

This patent discloses a method of manufacturing an insert drill having three or more flutes and a three flute insert drill that may be manufactured by the disclosed method. The method allows accurate machining of insert pockets without requiring removal of a large volume of material from an adjacent flute. The drill disclosed by this patent has three or more cutting inserts which cut chips that are smaller than drills of similar size that have a smaller number of cutting tip inserts. Smaller chips allow easier evacuation of chips and enhance cooling of the drill and workpiece.

14 Claims, 4 Drawing Sheets

METHOD OF MANUFACTURING AN INSERT DRILL

BACKGROUND OF THE INVENTION

Drilling holes in metal is fundamental to manufacturing products from metal and can be a significant part of the total manufacturing effort. Hole size, required accuracy, and drilling speed are important manufacturing considerations that determine the types of cutting tools and machinery used to drill holes. Cutting tool wear and hole accuracy present related problems that are particularly severe in high speed drilling. These and other related problems currently arise during use of both conventional and insert drills.

Conventional drills have cutting edges formed at a cutting end that extend from near the central axis to the outer radius of the drill and helical chip channels extending along the drill from the cutting edges. Chips cut by conventional drills are the width of the cutting edge. Wide metal chips can coil within the chip channel preventing chip evacuation from the cutting end. The resulting chip accumulation can cause heating of the cutting end of the drill causing the cutting edge to become dull or break. Further, excessive heat can harden the workpiece being drilled. Conventional drills are usually long enough to drill deep holes making the drill relatively flexible. Fast drilling can cause a conventional drill to vibrate, causing the drilled hole to have unacceptable accuracy and a poor surface finish.

Insert drills offer significant advantages over conventional drills for high speed manufacturing. An insert drill has replaceable cutting tip inserts mounted in pockets formed at the cutting end of the insert drill. Each insert has a cutting edge positioned at the cutting end of the insert drill. A cutting tip insert may have multiple cutting edges and may be mounted in an insert pocket in various orientations that position different cutting edges at the cutting end of the drill. Such inserts are referred to as indexable inserts. Insert drills conventionally are two flute drills. Typical two flute insert drills are shown in U.S. Pat. Nos. 4,230,429 and 4,558,975.

Cutting tip inserts are mounted at different radial locations at the cutting end of an insert drill so that each cutting tip insert cuts across a radial region between the drill axis and the outer radius of the drill. Cutting tip inserts overlap to provide continuous cutting from the drill axis to the radial extent of the insert drill. The length of the cutting edge of a cutting tip insert determines the width of the chips that ar cut by that single cutting tip insert. A two flute insert drill having two cutting tip inserts cuts chips that are about one half the width of the chips cut by a conventional drill of the same size. Small chips diminish the possibility of clogging the chip channel. The size of a cutting tip insert is limited to a maximum dimension to prevent vibration and breakage of the cutting tip insert. Larger diameter insert drills may have two or more inserts separated from each other along a single flute. In that case, cutting tip inserts in the other flute are positioned to extend across the gaps between inserts in the first flute and radially overlap them to provide cutting along the entire radius of the insert drill.

The insert pockets of insert drills must position the cutting tip insert to achieve optimal cutting and be sized to support the cutting tip insert. Insert pockets are conventionally machined in the insert faces at the cutting end of the insert drill by a cutter extending generally perpendicular to the insert face. This method requires unobstructed access to the entire insert pocket. The configuration of two flute insert drills easily accommodates this method of machining insert pockets.

While two flute insert drills offer significant improvements over conventional drills for high speed manufacturing, large loads must be applied to the drill to achieve high speed drilling. Large loads can cause vibration of the drill, heating of the cutting edges, and wear and breakage of the cutting tip inserts. Further, large drill loads can cause a slug of metal ahead of the drill at a through-surface of the workpiece to be pushed out as the drill is forced through the through-surface. The slug is approximately the size of the hole and may be ejected from the workpiece of high speed creating a hazard to persons near the workpiece. Further, a large burr is created as the slug is pushed out of the workpiece.

The design and use of insert drills is constrained by the need to minimize problems resulting from drill vibration and heating. To minimize vibration and maintain accuracy of the drilled hole, very stiff insert drills are typically limited to lengths that can drill holes less than 2.5 times the diameter of the drill. A second machine operation is often required to assure accuracy of the hole dimensions and an acceptable surface finish. Insert drills are often provided with cooling passages opening near the cutting end of the insert drill to allow coolant to be pumped into the chip channel adjacent the cutting tip to enhance transport of chips away from the cutting edge and cool both the insert drill and the workpiece.

The use of three flute insert drills has been suggested to diminish the severity of the problems associated with the two flute insert drill. U.S. Pat. No. 4,230,429 contains a drawing of a three flute insert drill However, there is no suggestion for a method of manufacturing the three flute insert drill. As is readily apparent, the insert pocket of a three flute insert drill closest to the center of the drill, cannot be manufactured by the method used to machine insert pockets in two flute insert drills. To provide unobstructed access to the innermost insert pocket along an axis perpendicular to the insert face, a substantial amount of the flute opposite the innermost cutting tip would have to be removed. The flute would be unacceptably weakened, diminishing the support of the cutting tip insert mounted to that flute.

The need therefore exists for a method of manufacturing a three flute insert drill which does not require removing a significant amount of material from flutes of the drill at the cutting end of the drill. In addition, there is a need for an insert drill that will allow high speed drilling of hole without requiring large loads. Further, there is a need for an insert drill that cuts metal during high speed drilling without requiring large loads to be applied to the drill.

SUMMARY OF THE INVENTION

In accordance with the present invention, the disadvantages of conventional drills and two flute insert drills have been overcome. A three flute insert drill is provided that can accurately drill deeper holes than two flute insert drills. In addition, an insert drill according to the present invention can drill holes at high speed without requiring large loads to be applied to the drill. As a consequence of lower loads, the heat generated by cutting is diminished. The cutting tip inserts do not wear as rapidly as inserts in two flute insert drills due to the lower load and lower temperature. Further, a three flute insert drill according to the present invention does not vibrate during high speed drilling and consequently drills holes that have a smooth surface finish. In addition, the present invention provides a method for accurately machining cutting tip insert pockets in insert drills that does not require unobstructed access to the insert pocket from a direction perpendicular to the insert face.

More particularly, the present invention includes a method of manufacturing an insert drill comprising providing an elongated insert drill shank lying along a drill axis and having a drill portion with chip channels extending along the drill portion from a cutting end of the insert drill. The shank has generally planar insert faces forming boundaries of the chip channels adjacent to the cutting end of the shank that are generally parallel to the drill axis and extending radially from near the drill axis. A cutting tool having a generally cylindrical cutting surface defined by a tool axis is sized to be positioned within a chip channel from the cutting end of the insert drill with the tool axis aligned generally parallel to the axis of the insert drill shank. The cutting tool is positioned adjacent to a location at which an insert pocket is to be machined. The cutting tool is then displaced into the insert face and translated along the insert face generally radial to the drill axis and along the drill axis to machine an insert pocket extending from the cutting end of the insert drill shank.

The method of the present invention is used to form generally rectangular pockets in the insert faces bounding the chip channels. The insert pockets are machined so that a straight cutting edge of a cutting tip insert extends from the cutting end of the shank both radially from the drill axis of the insert drill shank and along the drill axis. A cutting edge point is defined at the end of the cutting tip insert at the axially farthest extent along the drill axis of the cutting edge. Insert pockets are machined at radial locations along the insert faces from the drill axis to the outer radius of the insert drill shank. The size of each pocket is limited to the largest cutting tip insert that provides durable cutting in an insert drill. Insert pockets positioned radially adjacent to each other are formed in insert faces bounding adjacent chip channels. The radial extents of the cutting tip inserts overlap to provide continuous cutting from the drill axis to the outer radius of the insert drill.

Accordingly, it is an object of the present invention to provide an insert drill requiring lower loads to drill holes than those known in the art.

Another object of the present invention is to provide an insert drill that is capable of drilling holes deeper than insert drills known in the art.

It is yet another object of the present invention to provide an insert drill capable of drilling a straight accurately sized hole having a smooth hole surface.

Another object is to provide a drill that will drill through a workpiece without pushing a large slug out of the through-surface of the workpiece and thereby prevent creation of a workplace hazard.

Another object of the present invention is to provide an insert drill that can be used to drill holes having a smaller burr at the open end of the hole than holes bored by insert drills known in the art.

It is yet another object of the present invention to provide an insert drill that will minimize wear of the cutting tip inserts.

Yet another object of the present invention is to provide an insert drill having cutting tip inserts sized to reduce cutting tip insert breakage.

It is still another object of the present invention to provide an insert drill having indexable cutting tip inserts.

It is still another object of the present invention to provide an insert drill that will effectively drill holes to a depth at least three times the diameter of the drill.

It is still another object of the present invention to provide a method of manufacturing an insert drill that can be used to manufacture an insert drill having three or more flutes.

It is still another object of the present invention to provide a method of manufacturing an insert drill that does not require access to insert pockets from a direction perpendicular to the insert face in which the pocket is machined.

These and other objects, advantages, and novel features of the present invention, as well as details of an illustrative embodiment thereof, will be more fully understood from the following description and the drawings.

BRIEF DESCRIPTION OF THE DRAWINGS

FIG. 10 is a side partial section view of the insert drill shown in FIG. 1 illustrating a cutting tool machining the innermost insert pocket according to the method of the present invention.

FIG. 12 is a view of the section 12—12 of FIG. 10.

DESCRIPTION OF THE PREFERRED EMBODIMENT

Figure 1:
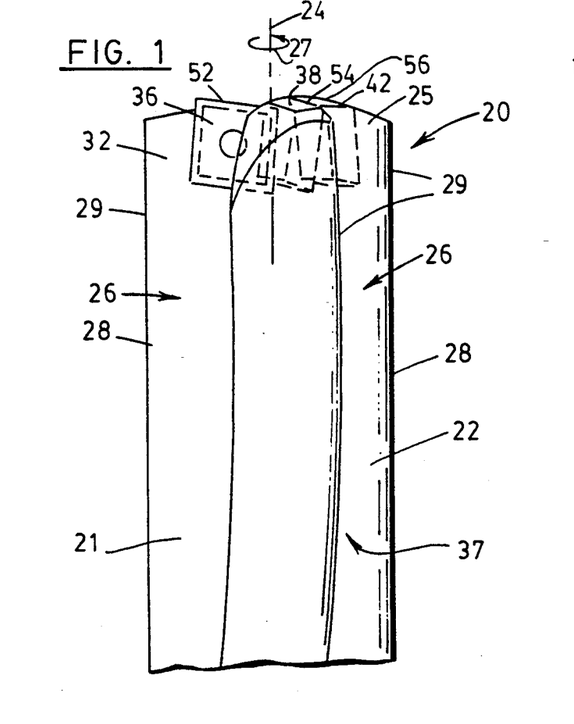
FIG. 1 is a side view of the drill portion of a three flute insert drill according to the present invention.

As shown by FIG. 1 as insert drill 20 of the present invention includes a drill shank 21 and cutting tip inserts 36, 38, and 42. A drill portion 22 adjacent to a cutting end 25 of the drill shank 21 includes three flutes 28. The flutes 28 are separated by chip channels 26 and include cylindrical outer surfaces 29 defined by a drill radius from a drill axis 24. It is preferred that flutes 28 and chip channels 26 extend from cutting end 25 along drill axis 24 and form a helix about drill axis 24 having a helix angle 37 in the range of 0 to 35.

Figure 2:
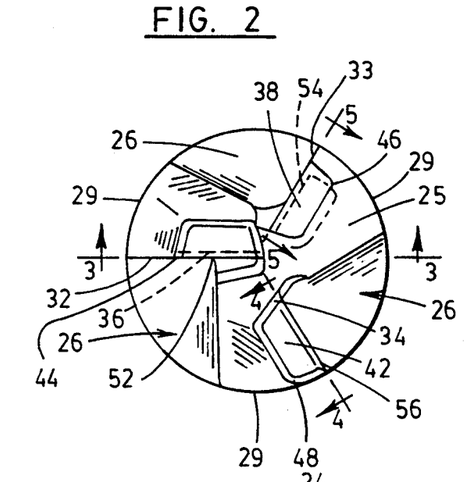
FIG. 2 is an end view of the three flute insert drill shown in FIG. 1.

As shown by FIGS. 1 and 2, a portion of each flute 28 bounding an adjacent chip channel 26 includes a generally planar insert face 32, 33, or 34 approximating a plane that is generally parallel to drill axis 24 and extends from the flute outer surface 29 generally radially inwardly toward drill axis 24. Insert drill 20 is constructed to be rotated about drill axis 24 in a drill rotation direction 27 and the insert faces 32, 33, and 34 follow the adjacent chip channel 26 when the insert drill 20 is rotated in the drill rotation direction 27.

FIG. 2 is a view from the cutting end 25 of the insert drill 20 shown in FIG. 1. Cutting tip inserts 36, 38, and 42 are secured in insert pockets 44, 46, and 48, respectively, that are located to collectively extend from drill axis 24 to the drill radius. The insert drill 20 drills a hole of radius equal to the distance from drill axis 24 to the radial outermost extent of the cutting tip insert 42. Innermost insert pocket 44 positions the cutting tip insert 36 to sweep an area equal to one-third the area of the cross section of the hole drilled by insert drill 20. Intermediate insert pocket 46 positions the cutting tip insert 38 at a radial location at which is partially adjacent to the outermost extent of the innermost cutting tip insert 36 and extends a distance that will cause the cutting tip inserts 36 and 38 to sweep an area equal to approximately two-thirds the area of the hole drilled by insert drill 20. Outer insert pocket 48 positions the cutting tip insert 42 to extend from a radial location which is partially adjacent the outermost extent of the intermediate cutting tip insert 38 to the outer radius of insert drill 20.

Figure 3:
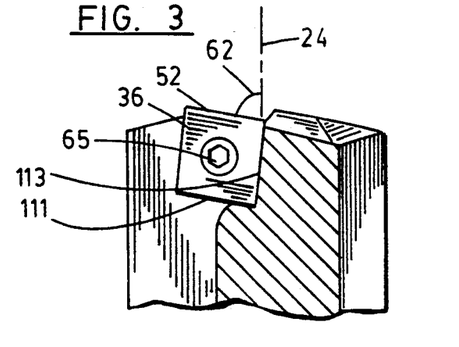
FIG. 3 is a view of the section 3—3 of FIG. 2.
Figure 4:
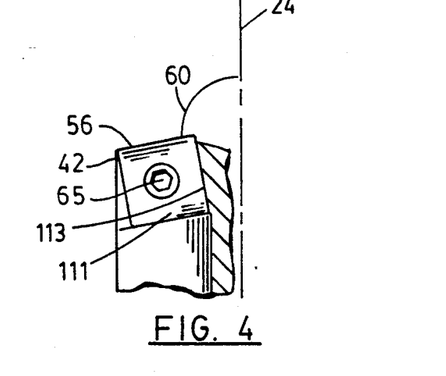
FIG. 4 is a view of the section 4—4 of FIG. 2.
Figure 5:
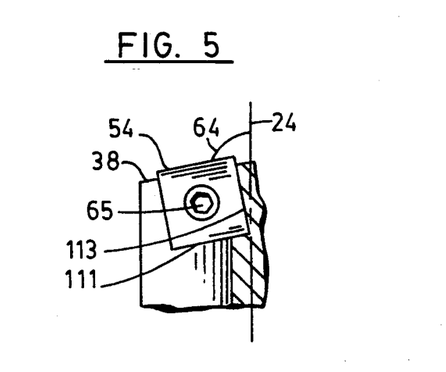
FIG. 5 is a view of the section 5—5 of FIG. 2.

As shown generally by FIG. 1, cutting tip inserts 36, 38, and 42 are generally square. Insert pockets 44, 46, and 48 position the cutting tip inserts 36, 38 and 42 so that cutting edges 52, 54, and 56 extend beyond cutting end 25. FIG. 3 illustrates the inner cutting tip insert 36 positioned within the innermost insert pocket 44. The innermost insert pocket 44 is formed to position the cutting tip insert 36 so that the cutting edge 52 forms a feed angle 62 with respect to drill axis 24 in the range of 60 to 85 degrees. As shown by FIG. 4, the outermost cutting tip insert 42 within the outermost insert pocket 48 positions cutting edge 56 to form a feed angle 66 with respect to drill axis 24 within the range of 95 to 120 degrees. Cutting tip inserts 36, 38, and 42 are retained within insert pockets 44, 46, and 48 by insert retaining screws 65 extending through insert tips 36, 38, and 42 and into drill portion 22. As shown by FIG. 5, the cutting tip insert 38 positioned within the intermediate insert pocket 46 positions the cutting edge 54 to form a feed angle 64 with respect to drill axis 24 in the range of 95 to 120 degrees.

As presently preferred, drill shank 21 is tool steel designated H-13. This tool steel may be machined as described in accordance with the present invention and subsequently heat-treated in accordance with conventional processes. It is expected that cutting tip inserts 36, 38, and 42 will be manufactured from a conventional carbide cutting material, such as a tungsten carbide. Users of a drill according to the present invention are expected to select a preferred insert based on factors related to individual applications such as material being machined by insert drill 21.

As illustrated by FIGS. 3, 4 and 5, the feed angles 62, 64, and 66 of the cutting tip inserts 36, 38, and 42 cause a corner bounding the cutting edges 52, 54, and 56 to be positioned at the farthest extent of the cutting edge 25 from the drill portion 22. The innermost insert pocket 44 is oriented to position the radially outer extent of the cutting edge 52 to be the farthest extent of the cutting edge along the direction of the drill axis 24. The intermediate insert pocket 46 and the outermost insert pocket 48 are oriented to position the radially inner extent of the cutting edges 54 and 56 to be the farthest extent of the cutting edges 54 and 56 along the direction of the drill axis 24. As shown in FIG. 1, cutting tip inserts 36, 38, and 42 are positioned so that the farthest extents of cutting edges 52, 54, and 56 define a plane perpendicular to drill axis 24 and consequently simultaneously contact a workpiece as insert drill 20 is moved along the direction of the drill axis 24.

As shown by FIGS. 6 through 12, the insert pockets 44, 46 and 48 are machined by a pocket cutting tool 72 positioned generally along the direction of the drill axis 24. The cutting tool 72 is sized so that it may be positioned within a chip channel 26 without impinging an adjacent flute.

Figure 6:
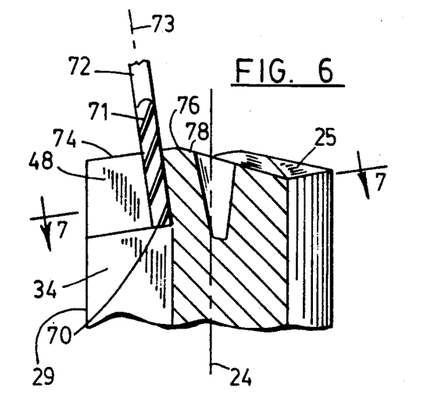
FIG. 6 is a side partial section view of the insert drill shown in FIG. 1 illustrating a cutting tool machining the outermost insert pocket according to the method of the present invention.
Figure 7:
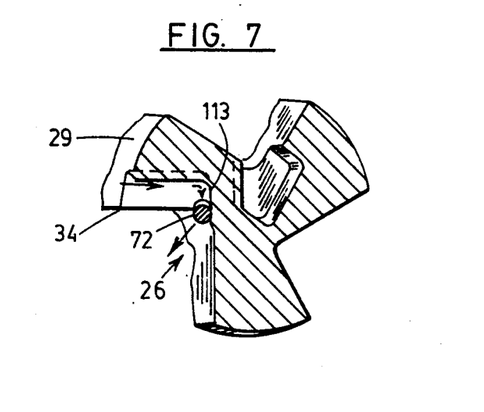
FIG. 7 is a view of the section 7—7 of FIG. 6.

As illustrated by FIGS. 6 and 7, pocket cutting tool 72 forms outer insert pocket 48 by cutting material from the flute 28 at the insert face 34 adjacent the drill end 25. The pocket cutting tool 72 is generally cylindrical lying along a tool axis 73. Pocket cutting tool 72 has cutting edges 71 extending along cutting tool 72 from a tool cutting end 70 that define a cylindrical cutting surface when cutting tool 72 rotates about tool axis 73. The cutting tool 72 is sized so that cutting edges 71 are at a radial distance from the tool axis 73 to permit the cutting tool 72 to be positioned within a chip channel 26 when tool axis 73 is oriented generally parallel to drill axis 24. Cutting edges 71 extend along cutting tool 72 to a distance from a cutting end 70 that is greater than the axial pocket length of an insert pocket 44, 46, or 48 from the cutting end 25 along the direction of drill axis 24.

As shown in FIG. 6, the cutting end 25 is formed to meet insert face 34 along an outer pocket outer edge 74 extending from a flute outer surface 29 radially inwardly toward the drill axis 24 and along drill axis 24 away from drill portion 22 to an outer pocket edge point 76. Cutting end 25 is formed to meet insert face 34 along an outer pocket inner edge 78 extending along toward drill axis 24 and toward drill portion 22 from edge point 76. As shown in FIG. 6, outer pocket 48 is formed by positioning pocket cutting tool 72 so that tool axis 73 is perpendicular to outer edge 74, tool cutting end 70 is adjacent to insert face 34 and cutting edges 71 extend beyond cutting end 25. Cutting tool 72 is translated in the direction of outer edge 74 generally along insert face 34 and toward drill axis 24 removing material from flute 28. Pocket cutting tool 72 is translated toward drill axis 24 to edge point 76. Pocket cutting tool 72 is then translated generally perpendicular to insert face 34 into adjacent chip channel 26 and then translated away from drill portion 22. Outer insert pocket 48 is thereby formed to position outer cutting tip insert 42 to have cutting edge 56 positioned to have its axially farthest extent from drill portion 22 adjacent to edge point 76.

Figure 8:
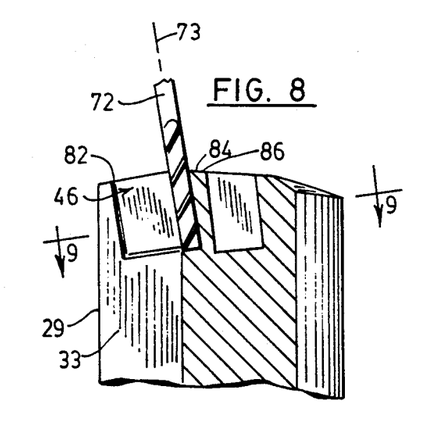
FIG. 8 is a side partial section view of the insert drill shown in FIG. 1 illustrating a cutting tool machining the intermediate insert pocket according to the method of the present invention.
Figure 9:
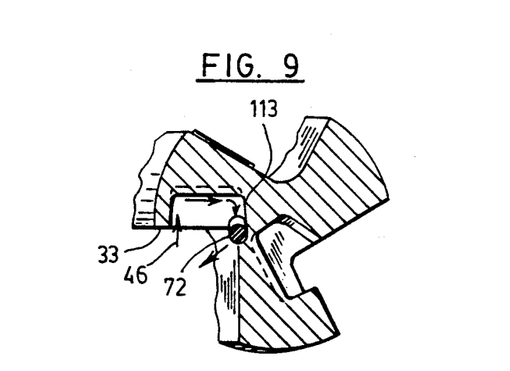
FIG. 9 is a view of the section 9—9 of FIG. 8.

FIGS. 8 and 9 illustrate pocket cutting tool 72 cutting intermediate insert pocket 46. Cutting end 25 is formed to meet insert face 33 at an intermediate pocket outer edge 82 which extends from flute surface 29 generally toward drill axis 24 and away from drill portion 22 to an intermediate pocket edge point 84. An intermediate pocket inner edge 86 extends from intermediate pocket edge point 84 generally toward drill axis 24 and toward drill portion 22. As illustrated by FIG. 8, pocket cutting tool 72 is positioned within the chip channel 26 adjacent to the insert face 33 The cutting tool 72 is positioned adjacent to the location of the radially outer extent of the intermediate insert pocket 46 with tool axis 73 perpendicular to outer edge 82. Cutting tool 72 is translated generally perpendicular to the insert face 33 into the flute 28; then generally along the direction of the outer edge 82 toward drill axis 24 to a location adjacent intermediate pocket edge point 84; then generally perpendicular to insert face 33 toward chip channel 26, to a location adjacent insert face 33; and then into chip channel 26.

Figure 13:
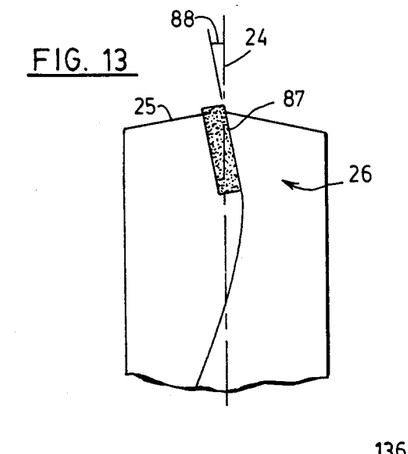
FIG. 13 is a side view of cutting tip insert and insert drill according to the present invention.
Figure 14:
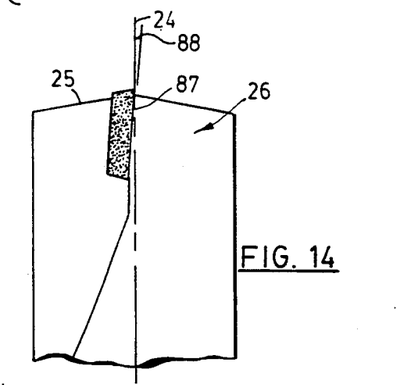
FIG. 14 is a side view of cutting tip insert and insert drill according to the present invention.

In addition to cutting insert pockets to position cutting edges as described above, insert pockets are formed by pocket cutting tool 72 to position cutting tip inserts to generally lie in a plane at a desired orientation with respect to drill axis 24. As shown by FIG. 13, a cutting tip insert 87 may be positioned by an insert pocket to extend downwardly from cutting end 25 toward an adjacent chip channel 26 to form an angle 88 with respect to drill axis 24. As illustrated by FIG. 14, a cutting tip insert 87 may extend downwardly from cutting end 25 and away from the adjacent chip channel 26 to form an angle 88 with respect to the drill axis 24. It is presently preferred that cutting tip insert 87 extending toward an adjacent chip channel, as illustrated by FIG. 13, be positioned to form an angle 88 within a range from about 0 degrees to about 15 degrees and that a cutting tip insert 87 extending away from an adjacent chip channel 26 form an angle 88 within a range from about 0 degrees to about 15 degrees.

Figure 15:
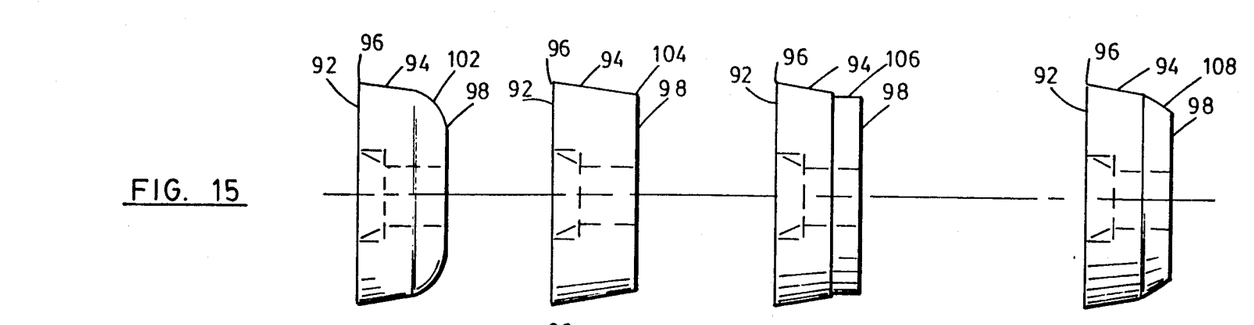
FIG. 15 is a side view of positive cutting tip inserts according to the present invention having various back edge profiles.
Figure 16:
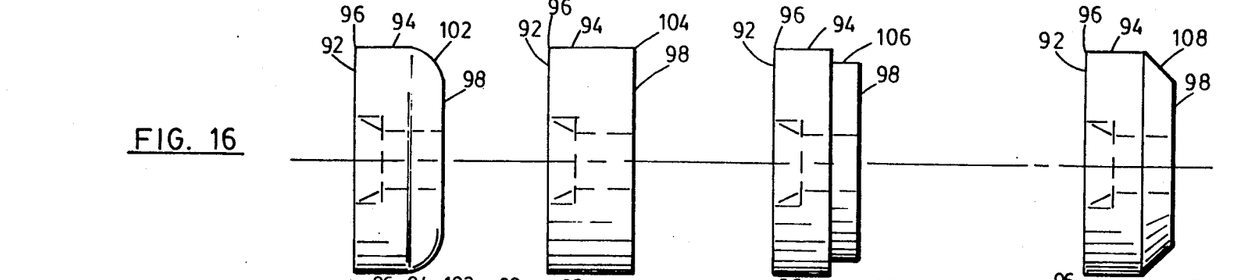
FIG. 16 is a side view of negative cutting tip inserts according to the present invention having various back edge profiles.
Figure 17:
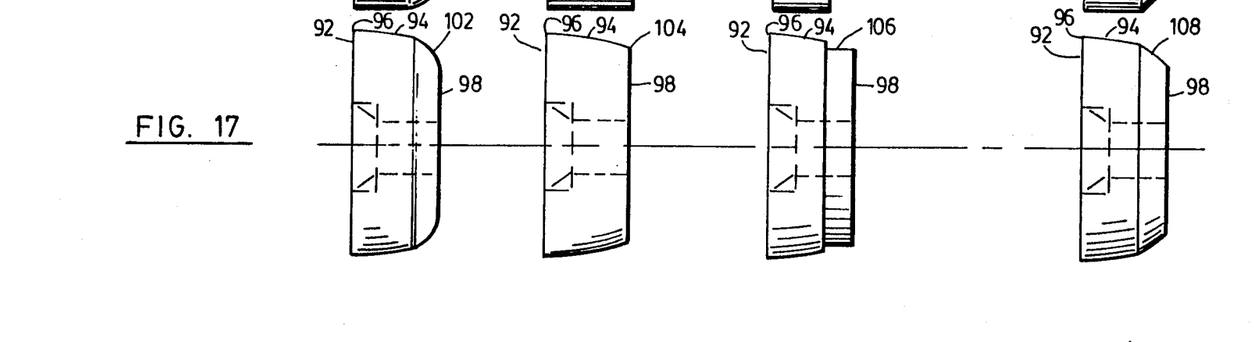
FIG. 17 is a side view of radius cutting tip inserts according to the present invention having various back edge profiles.

FIGS. 15, 16, and 17 illustrate side views of four cutting tip inserts having a cutting edge 96 formed by a cutting face 92 meeting a side 94 at the preferred angle. The cutting tip inserts of FIGS. 15, 16, and 17 are square, as described above, having four cutting edges 96 formed by four sides 94 and insert cutting face 92. FIGS. 15, 16, and 17 contain reference numerals for one side 94 of each illustrated insert. It should be understood that every side of an insert, including edges at the intersection of sides 94 and back face 98, are of identical shape. The cutting tip inserts illustrated by FIGS. 15, 16, and 17 also show alternative configurations for an edge at the intersection of insert back face 98 and side 94. A side 94 may meet back face 98 at a radiused relief 102, edge 104, square relief 106, or chamfered relief 108.

Figure 11:
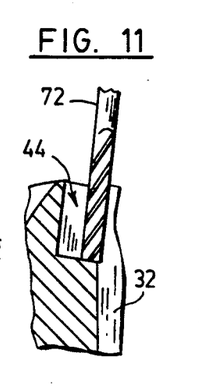
FIG. 11 is a view of the section 11—11 of FIG. 10.
Figure 18:
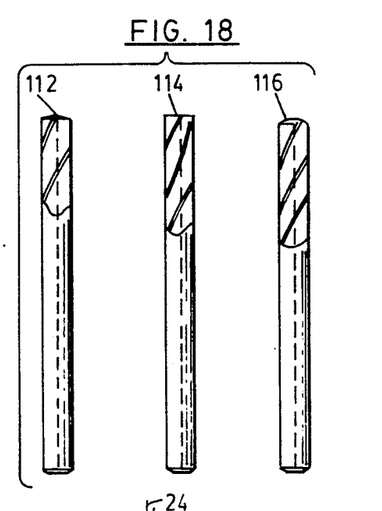
FIG. 18 is a side view of cutting tools that may be used for form seating edges for insert pockets.

The insert pockets of a drill according to the present invention are formed by machining subsequent to that described above cutting seating sides 111 and 113 of an insert pocket at the farthest extent from cutting end 25 and radial inner extent. FIGS. 10 and 11 illustrate pocket cutting tool 72 in positions at which seat cutting tools would be positioned to form seating sides 111 and 113 to position a cutting tip insert. Positive seat cutter 112 illustrated by FIG. 18 would be used to cut a seating side 111 to mate with a positive insert shown by FIG. 15. A negative seat cutter 114 illustrated by FIG. 18 would cut a seating side 111 to mate with a negative insert shown by FIG. 16, and radius seat cutter 116 illustrated by FIG. 18 would be used to cut a seating side 111 to mate with a radius insert shown by FIG. 17.

It is presently preferred that a side 94 positioned at cutting end 25 extend downwardly along the direction of drill axis 24 away from cutting edge 96 at an angle in the range of 90 degrees to 92 degrees to the adjacent insert face. As presently preferred, a positive insert, as shown in FIG. 15 having sides 94 meeting cutting face 92 at an angle of 79 degrees is positioned within a pocket to extend away from the adjacent chip channel, as shown by FIG. 14, at an angle 88 in the range of 1 degree to 3 degrees to achieve the preferred orientation of side 74 at cutting end 25.

Seat cutters 112, 114, and 116 cut seating side 113 as illustrated by the position and indicated path of pocket cutting tool 72 in FIGS. 7, 9 and 12. The radius of seat cutters 112, 114 and 116 forms the contour of the seating side 113 at the back of insert pocket. The seating side 113 is cut to conform to the cutting tip insert side 94 by translation toward adjacent chip channel 26, as shown in FIGS. 7, 9, and 12.

Figure 19:
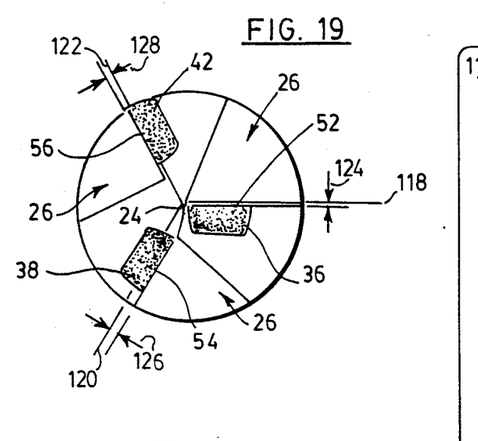
FIG. 19 is an end view of an insert drill according to the present invention.

The position of inner cutting tip insert 36, intermediate cutting tip insert 38, and outermost cutting tip insert 42 with respect to uniformly spaced drill radii 118, 120 and 122, are illustrated by FIG. 19. Cutting edge 52 of inner cutting tip insert 36 is parallel to radii 118 and displaced away from adjacent chip channel 26 by an inner insert offset 124 which is preferred to be within the range of 0 to 0.010 inches. Cutting edge 54 of intermediate cutting tip insert 38 is parallel to radius 120 and offset toward adjacent chip channel 26 by an intermediate insert offset 126 which is preferred to be within the range of 0 to 0.25 inches. Cutting edge 56 of outer cutting tip insert 42 is parallel to radius 122 and offset toward adjacent chip channel 26 by an outer insert offset 128 which is preferred to be within the range of 0 to 0.25 inches.

Figure 20:
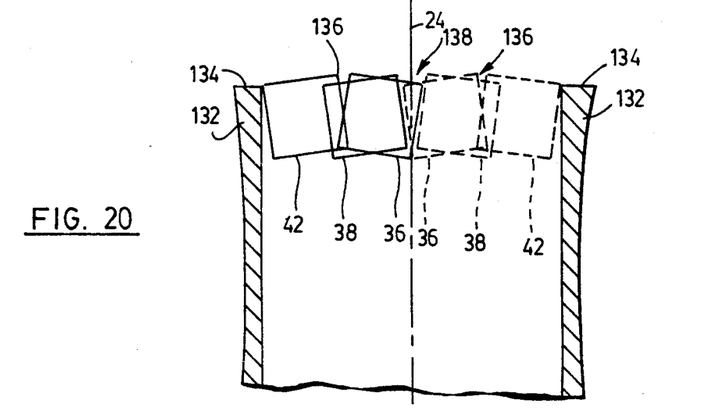
FIG. 20 is a section view of a hole drilled by an insert drill according to the present invention and projections of cutting tip inserts on a diametral plane of the hole.

A three-flute insert drill having the preferred configuration described above has been found to require significantly lower horsepower and lower forces during drill than are typically required to conventional two-flute insert drills. As a consequence, it has been found that a three-flute insert drill of the preferred configuration will drill through a workpiece by cutting metal entirely through a through surface rather than forcing a piece out of the workpiece at the through-surface. FIG. 20 illustrates inner cutting tip insert 36, intermediate cutting tip insert 38, and outer cutting tip insert 42 projected on a diametral plane of a hole through a workpiece 132. A surface 134 workpiece 132 is indicated adjacent to the illustrated projections of the cutting tip inserts. When boring through a workpiece 132, a three-flute insert drill having cutting tip inserts positioned as illustrated by FIG. 20 has been found to produce a slug from a region 138 adjacent to the location of drill axis 24 having a size and cross-section as indicated by the projections of innermost cutting tip insert 36 and intermediate cutting tip insert 38 as shown by FIG. 20. A ring is produced from the annular region 136 having a cross-section illustrated in FIG. 20. Because the slug produced from region 138 and ring produced from region 136 are much smaller than the area of the cross-section bored by the insert drill, they present less of a hazard to personnel near the drill than a slug of the size of the cross-section of the drill which may be forced from the workpiece by a drill to which a large force is applied.

Though not described above, cooling passages may be provided in drill shank 21. As is conventional in known index drills, a main coolant channel may extend through drill shank 21 from an end opposite the drill portion to a location near the cutting end 25. Individual cutter channels may then extend from the main channel to openings in a chip channel adjacent or opposite to cutting tip inserts. Coolant is introduced into the main coolant channel at the end of the drill shank opposite the cutting end. Coolant leaves the coolant cutter channels adjacent to the cutting tip inserts and flows away from the cutting end through the chip channels transporting chips away from the cutting end of the drill.

It is evident that many modifications and variations of the present invention are possible in light of the above teachings. Therefore, it is understood that within the scope of the appended claims, the invention may be practiced other than as described above.

I claim:

1. A method of manufacturing an insert drill comprising the steps of:
    providing an elongate insert drill shank having a drill axis, a drill portion extending from a cutting end of the drill shank, a chip channel in the drill portion extending along the drill shank from the cutting end, and defined by a boundary of a generally flat insert face approximating a plane that is generally parallel to the drill axis and forms the chip channel adjacent to the cutting end that moves in a direction following the chip channel as the drill shank is rotated about the drill axis in a drill rotation direction;
    providing a pocket cutting tool for rotation about a tool axis that is sized to allow the pocket cutting tool to extend into the chip channel from the cutting end when the tool axis is oriented generally along the drill axis and constructed to cut along a cylindrical cutting surface extending from a tool cutting end defined by rotation of the tool about the tool axis and extending from a tool cutting end;
    positioning the pocket cutting tool so that the tool axis extends in a direction approximately along the axis of the drill shank and the pocket cutting tool is spaced apart from the insert face adjacent to a location on the insert face at which an insert pocket for receiving a cutting tool insert is to be formed and the tool cutting end is at a location not farther from the cutting end than an axial pocket length of the insert pocket and the cylindrical cutting surface extends beyond the cutting end;
    cutting the insert pocket into the insert drill shank by translating the pocket cutting tool into the insert face along a direction approximately perpendicular to the tool axis to a machined depth and translating the pocket cutting tool in a plane generally parallel to the insert face to radially inner and outer extents of the insert pocket and in a direction generally along the drill axis to the pocket length; and
    removing the pocket cutting tool by translating the cutting tool in a direction away from the insert pocket
whereby an insert pocket may be machined at the cutting end of an insert drill by a cutting tool extending generally along the axis of the drill into the chip channel from the cutting end of the drill.

2. The method of manufacturing an insert drill of claim 1 wherein the location adjacent which the pocket cutting tool is positioned is the radially outer extent of the insert pocket and the tool cutting end extends to the axial pocket length from the cutting end and the insert pocket is cut by translating the cutting tool into the insert face in a direction approximately perpendicular to the tool axis and translating the cutting tool in a direction parallel to the insert face radially inward toward the drill axis to the radially inner extent of the insert pocket forming the insert pocket with outer and inner side surfaces parallel to the tool axis and a bottom surface defined by the translation of the tool cutting end whereby an insert pocket having straight side and bottom surfaces may by formed by one translation of the cutting tool into the insert face and one translation parallel to the insert face.

3. The method of manufacturing an insert drill of claim 1 wherein:
    the step of providing an elongate insert drill shank comprises providing an insert drill shank having an insert face and cutting end that intersect at a drill edge, the drill edge having an outer edge extending from a farthest radial extent from the drill axis toward the drill axis and along the drill axis outwardly from the drill portion to an edge point at a farthest extent of the drill edge along the drill axis, and an inner edge extending toward the drill axis from the edge point and along the drill axis toward the drill portion to an inner extent of the drill edge;
    the step of positioning the pocket cutting tool comprises positioning the pocket cutting tool adjacent to the insert face at a location that is the radially outer extent from the drill axis of the insert pocket and positioning the tool cutting end at a location that is a distance equal to the axial pocket length from the cutting end of the insert drill shank; and
    the step of cutting the insert pocket comprises, after the cutting tool has been translated perpendicular to the tool axis, translating the cutting tool in a direction parallel to the insert face radially inward toward the drill axis to the edge point,
whereby the insert pocket is formed with outer and inner side surfaces parallel to the tool axis, a bottom surface of the insert pocket is defined by the direction of translation of the tool cutting end, and the insert pocket extends along the outer edge to the edge point and is formed by one translation of the cutting tool along the cutting tool surface.

4. The method of claim 3 wherein the step of positioning the pocket cutting tool comprises positioning the tool axis perpendicular to the outer edge.

5. The method of manufacturing an insert drill of claim 3 wherein the step of cutting the insert pocket comprises translating the pocket cutting tool in a direction parallel to the outer edge after the pocket cutting tool is translated to a machined depth.

6. The method of manufacturing an insert drill of claim 3 wherein the step of positioning the pocket cutting tool comprises positioning the pocket cutting tool so that the tool axis is perpendicular to the outer edge and wherein the step of cutting the insert pocket comprises translating the pocket cutting tool in a plane generally parallel to the insert face and in a direction parallel to the outer edge whereby the bottom of the insert pocket is parallel to the outer edge and perpendicular to the sides of the insert pocket.

7. The method of manufacturing an insert drill of claim 1 wherein:

the step of providing an elongate insert drill shank comprises providing an insert drill shank having an insert face and cutting end that intersect at a drill edge, the drill edge having an outer edge extending from a farthest radial extent from the drill axis and along the drill axis outwardly from the drill portion to an edge point at a farthest extent of the drill edge along the drill axis, and an inner edge extending toward the drill axis from the edge point and along the drill axis toward the drill portion to an inner extent of the drill edge;

the step of positioning the pocket cutting tool comprises positioning the pocket cutting tool adjacent to the insert face at a location adjacent to the edge point and positioning the tool cutting end at a location that is a distance from the cutting end equal to the axial pocket length; and the step of cutting the insert pocket comprises translating the pocket cutting tool in a direction parallel to the insert face radially inward toward the drill axis after translating the pocket cutting tool into the insert face, whereby the insert pocket is formed with outer and inner side surfaces parallel to the tool axis and a bottom surface defined by translation of the tool cutting end, the insert pocket is formed by one translation of the cutting tool along the insert face, and the insert pocket extends along the inner edge from the edge point.

8. The method of manufacturing an insert drill of claim 7 wherein the step of positioning the pocket cutting tool comprises positioning the pocket cutting tool so that the tool axis extends in a direction that is approximately along the axis of the drill shank and perpendicular to the inner edge.

9. The method of manufacturing an insert drill of claim 7 wherein the step of cutting the insert pocket comprises translating the pocket cutting tool in a plane approximately parallel to the insert face and in a direction parallel to the inner edge.

10. The method of manufacturing an insert drill of claim 7 wherein the step of positioning the pocket cutting tool comprises positioning the cutting tool so that the tool axis extends along a direction approximately along the axis of the drill shank, and perpendicular to the inner edge and wherein the step of cutting the insert pocket comprises translating the pocket cutting tool in a plane generally parallel to the insert face and in a direction parallel to the inner edge whereby the bottom of the insert pocket is parallel to the inner edge and perpendicular to the sides of the insert pocket.

11. The method of manufacturing an insert drill of claim 1 wherein the insert drill shank has a second chip channel in the drill portion extending along the drill shank from the cutting end that is separated from the chip channel and sized similarly to the chip channel and defined by a boundary of the second chip channel adjacent to the cutting end generally flat second insert face approximating a plane that is generally parallel to the drill axis forms a boundary of the second chip channel adjacent to the cutting end that follows the second chip channel as the drill shank is rotated about the drill axis in the drill rotation direction, and further comprising the steps of:

positioning the pocket cutting tool so that the tool axis extends in a direction approximately along the axis of the drill shank and the pocket cutting tool is spaced apart from the second insert face adjacent to a location on the second insert face at which a second insert pocket for receiving a cutting tool insert is to be formed and the tool cutting end extending to a location not farther from the cutting end than the axial pocket length and the cylindrical cutting surface extends outwardly beyond the cutting end;

cutting the second insert pocket into the insert drill shank by translating the pocket cutting tool into the second insert face along a direction approximately perpendicular to the tool axis to the machined depth and translating the pocket cutting tool in a direction extending generally radial from the drill axis in a plane parallel to the second insert face to radially inner and outer extents of the second insert pocket and in a direction generally along the drill axis to the axial pocket length; and removing the pocket cutting tool by translating the cutting tool in a direction away from the second insert pocket whereby an insert pocket and a second insert pocket may be machined at the cutting end of an insert drill by a pocket cutting tool extending generally along the drill axis into the chip channel and the second chip channel respectively from the cutting end of the drill.

12. The method of manufacturing an insert drill of claim 11 wherein the radially inner and outer extents of the insert pocket are separated by a radial pocket length and the radially inner and outer extents of the second insert pocket are separated by the radial pocket length, the radial pocket length being greater than half a distance from the drill axis to a radially outer extent of the drill shank, and the insert pocket and the second insert pocket are positioned at locations wherein one of the pockets extends radially outwardly from the drill axis and one of the pockets extends radially inwardly from the outer extent of the drill shank from the drill axis, whereby cutting tools secured in the insert pockets collectively span the distance from the drill axis to the radially outer extent of the drill shank.

13. The method of manufacturing an insert drill of claim 11 wherein the insert drill shank has a third chip channel in the drill portion extending along the drill portion from the cutting end that is separated from the chip channel and the second chip channel and sized similarly to the chip channel and a generally flat third insert face approximating a plane that is generally parallel to the drill axis and forms a boundary of the third chip channel adjacent to the drill end that moves in a direction following the third chip channel as the drill shank is rotated about the drill axis in the drill rotation direction, and further comprising the steps of:

positioning the pocket cutting tool so that the tool axis extends in a direction approximately along the drill axis and the cutting tool is spaced apart from the third insert face adjacent to a location on the third insert face at which a third insert pocket is to be formed and the tool cutting end extending to a location not farther from the cutting end than the axial pocket length and the cylindrical cutting surface extends outwardly beyond the drill end in the drill axis direction;

cutting the third insert pocket into the third insert face by translating the pocket cutting tool into the third insert face along a direction approximately perpendicular to the tool axis to the machined depth and translating the pocket cutting tool in a direction extending generally radial from the drill axis in a plane parallel to the third insert face to radially inner and outer extents of the third insert pocket and in a direction generally along the drill axis to the axial pocket length; and removing the cutting tool by translating the cutting tool in a direction away from the third insert pocket whereby an insert pocket, a second insert pocket, and a third insert pocket may be machined at the cutting end of an insert drill by a pocket cutting tool extending generally along the axis of the drill into the chip channel, the second chip channel, and the third chip channel respectively from the drill end of the drill.

14. The method of manufacturing an insert drill of claim 13 wherein:

the step of positioning the pocket cutting tool at a location spaced apart from the insert face comprises positioning the pocket cutting tool adjacent to the radially outer extent of the insert face;

the step of cutting the insert pocket comprises translating the pocket cutting tool in a plane generally parallel to the insert face from the radially outer extent of the insert face toward the drill axis a radial pocket length that is greater than one third the distance from the drill axis to the radially outer extent of the drill shank to the radially inner extent of the insert pocket;

the step of positioning the pocket cutting tool adjacent to the second insert face comprises positioning the pocket cutting tool adjacent to a location on the second insert face that is a distance from the drill axis greater than the distance to the radially inner extent of the insert pocket from the drill axis;

the step of cutting the second insert pocket comprises translating the pocket cutting tool in a plane parallel to the second insert face toward the drill axis a distance equal to the radial pocket length;

the step of positioning the pocket cutting tool adjacent to the third insert face comprises positioning the pocket cutting tool adjacent to a location on the third insert face a distance equal to the radial pocket length from the drill axis; and the step of cutting the third insert pocket comprises translating the pocket cutting tool in a plane parallel to the third insert face to the drill axis, whereby cutting tip inserts secured in the insert pockets collectively span the distance from the drill axis to the radially outer extent of the drill shank.

* * * * *